United States Patent [19]

Haugsby et al.

[11] Patent Number: 4,973,623

[45] Date of Patent: Nov. 27, 1990

[54] FAST CURING OXIMO-ETHOXY FUNCTIONAL SILOXANE SEALANTS

[75] Inventors: Michael H. Haugsby; Loren D. Lower, both of Midland, Mich.

[73] Assignee: Dow Corning Corporation, Midland, Mich.

[21] Appl. No.: 358,987

[22] Filed: May 26, 1989

[51] Int. Cl.$^5$ .............................................. C08L 83/04
[52] U.S. Cl. ............................... 524/863; 524/469; 524/588; 524/858; 524/860; 528/18; 528/33; 528/34
[58] Field of Search ............... 528/18, 33, 34; 524/469, 588, 858, 860, 863

[56] References Cited

U.S. PATENT DOCUMENTS

| | | | |
|---|---|---|---|
| 3,189,576 | 6/1965 | Sweet | 260/465 |
| 4,371,682 | 2/1983 | Hashimoto | 528/34 |
| 4,503,210 | 3/1985 | Von Au et al. | 528/33 |
| 4,657,967 | 4/1987 | Klosowski et al. | 524/860 |

FOREIGN PATENT DOCUMENTS 98369 of 1984 European Pat. Off.
39967 of 1974 Japan.

*Primary Examiner*—Melvyn I. Marquis
*Attorney, Agent, or Firm*—Roger H. Borrousch

[57] ABSTRACT

A room temperature curing composition which cures fast and has good reversion resistance and good package stability is a mixture of 66.75 to 89.4 weight percent of a hydroxyl endblocked polydiorganosiloxane; 5.5 to 10 weight percent of a tetrafunctional ethoxy-ketoximo silane mixture having 6 to 27 weight perent tetraketoximosilane, 9 to 39 weight percent of monoethoxytriketoximosilane, 38 to 60 weight percent of diethoxydiketoximosilane, and 5.5 to 25 weight percent triethoxymonoketoximosilane; 0.1 to 0.25 weight percent of a tin catalyst, 0 to 3 weight percent of an adhesion promoter, and 5 to 20 weight percent of reinforcing silica. These compositions cure to elastomeric materials useful as caulking materials, adhesives, coatings and encapsulating materials for construction and automotive industries.

22 Claims, No Drawings

FAST CURING OXIMO-ETHOXY FUNCTIONAL SILOXANE SEALANTS

BACKGROUND OF THE INVENTION

1. Field of the Invention

This invention relates to compositions which cure at room temperature to elastomeric type products useful as sealants.

2. Background Information

Many kinds of very useful compositions cure at room temperature to elastomeric materials having a broad spectrum of physical and chemical properties. However, with every desirable property, there seems to be undesirable properties and one is continually faced with the problem of choosing the right composition for the specific application. The application to which room temperature curing compositions can be put, keep increasing, and with the increasing variety of applications, the specific kinds of properties required, keep changing. The need for new room temperature curing compositions with new properties is thus in demand. The market is continually looking for the new desirable properties without the same previous undesirable properties.

One kind of room temperature curing composition is described by Sweet in U.S. Pat. No. 3,189,576, issued June 15, 1965. Sweet describes oxime silane crosslinkers which are useful to make room temperature curing compositions. Oximo and ketoximo are considered the same group. Sweet teaches trifunctional ketoximo silanes and tetrafunotional ketoximo silanes as crosslinkers. These crosslinkers can be used to make room temperature curing silicone elastomeric compositions by mixing them with hydroxyl endblocked polydiorganosiloxane. The compositions can also contain fillers and curing catalysts. The Sweet method of making the ketoximo silanes is reacting chlorosilanes with ketoxime in the presence of an acid acceptor. This method can be used to make the silanes, but the method was found to be hazardous because it produced an exotherm which could result in an explosion. Although the resulting products are desirable, the method limited the usefulness of the ketoximo silanes as crosslinkers in room temperature curing compositions. Von Au et al in U.S. Pat. No. 4,503,210, issued Mar. 5, 1985, teach oxime containing compositions containing silicon compounds with three and four oxime groups per molecule.

Wada et al. in Japanese Patent Publication No. 49[1974]39967, published Oct. 30, 1974, teach oxime containing silanes. Wada et al. teach that the method of manufacturing organosilanes containing oxime groups bonded directly to the silicon atom is reacting tetrachlorosilanes and methyltrichlorosilanes with oximes in the presence of an acid acceptor and a solvent. Wada et al. teach that this method had some difficulties. Wada et al. report that the method requires a tremendous quantity of solvent, a tremendous quantity of amine which is toxic and has a disagreeable odor, requires an anhydrous environment, requires special equipment to filter the reaction product and keep the conditions anhydrous, and requires extremely difficult measures to remove the salts of amine and hydrogen chloride. Wada et al. teach that these shortcomings can be overcome if the following method for the manufacture of organosilanes which contain oxime bonded directly to silicon atoms is used. This new method by Wada et al. is demethanolating R'$_a$Si(OCH3)$_{4-a}$ with an oxime of the formula X=NOH, where a is 0 or 1, R' is hydrocarbon, halogenated hydrocarbon, or cyanohydrocarbon, and X is R'$_2$C= or R''C= where R'' is a divalent hydrocarbon group or halogenated hydrocarbon group. A catalyst can be used if necessary for the demethanolation. The product obtained by Wada et al. has the following formula

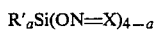

R'$_a$Si(OCH3)$_b$(ON=X)$_{4-(a+b)}$.

Wada et al. teach that it is conceivable to use alkoxysilanes such as ethoxysilane, propoxysilane, and butoxysilane instead of the starting methoxysilane, but that none of these other alkoxysilanes seem appropriate for use in their method. For example, when ethoxysilane is used, the deethanolating reaction proceeds minimally and it is difficult to obtain the intended organosilane which contains an oxime group. Wada et al. report that the propoxysilane and the butoxysilane hardly react at all. In an example, Wada et al teach a composition made by kneading methylmethoxydioximosilane, dimethylpolysiloxane having hydroxy groups on both molecular chain terminals, fumed silica, and dibutyl tin dilaurate. This composition is reported to cure to a hardened rubber elastomer after 24 hours.

Hashimoto in U.S. Pat. No. 4,371,682, issued Feb. 1, 1983, teaches a room temperature curable polyorganosiloxane composition containing as the crosslinker an oxime containing compound produced by an oxime radical-methoxyl radical exchange reaction using an oxime radical containing compound of the formula

R'$_a$Si(ON=X)$_{4-a}$ in which a is 0 or 1 and a methoxyl radical containing compound of the formula R'$_b$Si(OCH3)$_{4-b}$ in which b is 0 or 1 and the ratio of the oxime radical to the methoxyl radical is from 1:0.2 to 1:2. Hashimoto teaches that using the reaction product provides a room temperature curing composition which cures faster when exposed to moisture. Hashimoto's composition requires the presence of a curing catalyst in order to obtain a cured product in a short period of time.

Chempolil et al. in European Patent Application No. 98,369, published January 18, 1984, teach a process for making alkoxyoximosilanes by reacting a silicon halide of the formula R$_{4-n}$SiY$_n$ where n is an integer of 2 to 4 with an alcohol having 1 to 24 carbon atoms and an oxime of the formula R'$_2$C=NOH to produce at least one alkoxyoximosilane of the formula

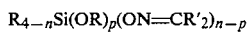

R$_{4-n}$Si(OR)$_p$(ON=CR'$_2$)$_{n-p}$ where p is an integer of 1 to 3, but is at least one less than n and the hydrohalide of the oxime by-product. The molar ratio of alcohol to silicon halide is m:1, wherein m is at least 0.1 n and less than n. and the molar ratio of oxime to silicon halide is at least (2n−m):1. Chempolil et al.. however, do not show any tetrafunctional silanes and the resulting products. The difficulty with chlorosilanes and by-products has not been overcome by the process of Chempolil et al.

Klosowski et al in U.S. Pat. No. 4,657,967, issued Apr. 14, 1987, teach room temperature curing compositions containing tetrafunctional ethoxy-ketoximo silane crosslinkers. The crosslinkers of Klosowski et al are described as a mixture of species which is 0 to 80 weight percent tetraketoximosilane, 20 to 70 weight percent monoethoxytriketoximosilane, 1 to 60 weight percent diethoxydiketoximosilane, and 0 to 20 weight percent triethoxymonoketoximosilane as the broad range. Klosowski et al teach that the preferred range of species in the mixture are 2 to 40 weight percent tetraketoximosilane, 45 to 65 monoethoxytriketoximosilane, 8 to 45 diethoxydiketoximosilane, and 0 to 8 weight percent triethoxymonoketoximosilane. Klosowski et al also teach that the compositions are made up of hydroxyl endblocked polydiorganosiloxane and the tetrafunctional ethoxy-ketoximo silane crosslinker, optionally a filler can be present. They teach that such compositions cure rapidly at room temperature when exposed to moisture, but that if even faster curing is required that a curing catalyst can be used. Klosowski et al caution that curing catalyst which cause reversion should not be used, such catalyst include amines and metal carboxylates, such as dibutyltindiacetate, dibutyltindilaurate, and stannous octoate, lead carboxylates and zinc carboxylates. Klosowski et al teach that non-reversion catalyst should be used such as organotitanates. They teach that an advantage of their compositions is that they cure rapidly without the presence of a curing catalyst, especially without a tin catalyst or other catalyst which can cause reversion.

SUMMARY OF THE INVENTION

An object of the present invention is to produce a room temperature curing composition Which cures faster than other compositions having tetrafunctional ethoxy-ketoximo silane crosslinker while maintaining good reversion resistance and good package stability. Another object is to improve the initial strength and adhesion to substrates, such as polyvinyl chloride, wood, aluminum, and glass.

This invention relates to a composition consisting essentially of a product which is storage stable in a package when protected from moisture but cures when removed from the package and exposed to moisture and which is obtained by mixing the following ingredients, (A) from 66.75 to 89.4 weight percent of a hydroxyl endblocked polydiorganosiloxane having an average viscosity at 25° C. of from 0.5 to 100 Pa.s and the organic radicals bonded to the silicon atom are selected from the group consisting of monovalent hydrocarbon radicals and monovalent halogenated hydrocarbon radicals, (B) from 5.5 to 10 weight percent of a tetrafunctional ethoxy-ketoximo silane mixture of 6 to 27 weight percent of tetraketoximosilane, 9 to 39 weight percent of monoethoxytri-ketoximosilane, 38 to 60 weight percent of diethoxydiketoximo-silane, and 5.5 to 25 weight percent triethoxymonoketoximosilane in which the ketoximo groups have a formula —O—N=CR'R' in which each R' is an alkyl radical having from 1 to 4 carbon atoms, (C) from 0.1 to 0.25 weight percent of a tin catalyst, (D) from 0 to 3 weight percent of an adhesion promoter which does not impart color to the composition, and (E) from 5 to 20 weight percent of reinforcing silica.

DETAILED DESCRIPTION OF THE INVENTION

The compositions of the present invention are stable at room temperature when protected from moisture, but cure when exposed to moisture. The composition can be protected from moisture by placing the composition in a package which is sealed and does not allow moisture to enter, including atmospheric moisture. The composition of the present invention should not be made with ingredients which contain quantities of water which will effect the storage stability. The presence of watercontaining ingredients in the composition will cause the composition to cure in the storage package and thus the composition will not be a useful material. Compositions which can be stored in a single package and later cured by extruding the composition from the package and allowing moisture to contact it, are known as one package compositions, one component compositions, or one-part compositions.

The compositions of the present inventions contain at least four ingredients, (A) a hydroxyl endblocked polydiorganosiloxane, (B) a tetrafunctional ethoxy-ketoximo silane, (C) a tin catalyst, and (E) a reinforcing silica filler. Preferably, the compositions contain five ingredients, the fifth ingredient being an adhesion promoter which does not impart color the composition or the cured product. Compositions containing these ingredients will cure rapidly at room temperature. These compositions cure to tack free surfaces in 1 to 12 minutes and cure in deep section at the rate of 1.7 to 3.0 mm per day. The compositions described by Klosowski et al without a catalyst cured to provide a skinned over surface in less than 30 minutes when exposed to atmospheric moisture and became tack-free in as little time as one hour and with catalyst tack free times of 22 to 25 minutes were observed.

The hydroxyl endblocked polydiorganosiloxanes of (A) can be those having an average viscosity at 25° C. of 0.5 to 100 Pa.s, preferably from 1 to 50 Pa.s. The organic radical of the polydiorganosiloxane can be monovalent hydrocarbon radicals or monovalent halogenated hydrocarbon radicals. Examples of the monovalent hydrocarbon radicals are methyl, ethyl, propyl, butyl, phenyl, vinyl, allyl, cyclohexyl, tolyl, and isopropyl. Examples of monovalent halogenated hydrocarbon radicals are chloropropyl, 3,3,3-trifluoropropyl, chlorophenyl, beta-(perfluorobutyl)ethyl, and chlorocyclohexyl. Preferably, the organic radicals are methyl, vinyl, ethyl, phenyl, and 3,3,3-trifluoropropyl. The polydiorganosiloxane can have in addition to the diorganosiloxane units, monoorganosilsesquioxane units, triorganosiloxy units, and $SiO_2$ units. A preferred class of the polydiorganosiloxanes are those which have triorganosiloxy units partially endblocking the polymers such that some of the endblocking groups are triorganosiloxy units and some are hydroxyl groups. For example, these polydiorganosiloxanes which have both hydroxyl endblocking and triorganosiloxy endblocking are known in the art from U.S. Pat. No. 3,274,145, by Dupree, issued Sept. 20, 1966 which is hereby incorporated by reference to show these polymers and their preparation. The units other than the diorganosiloxane units are preferably present in small amounts, such as less than 5 mol percent of the total units present. (A) can be a mixture of two or more polydiorganosiloxanes, as long as, the average viscosity of the mixture falls within the range of viscosities stated above. For example, (A) can consist of a mixture of two polydimethylsiloxanes of different viscosities, or (A) can consist of polydimethylsiloxane, polymethylphenylsiloxane, and polymethylvinylsiloxane all being hydroxyl endblocked. The viscosity of (A) can result from a mixture of two or more hydroxyl endblocked polydiorganosiloxanes wherein some of the polymers can have a viscosity less than 0.5 Pa.s, such as 0.08 Pa.s, or greater than 100 Pa.s, such as gum viscosities (>1,000 Pa.s), as long as the average viscosity at 25° C. of (A) is in the range of from 0.5 Pa.s to 100 Pa.s. The mixtures of polydiorganosiloxanes in (A) can provide properties to the uncured composition, as well as, to the cured product. Such properties can he flow characteristics of the uncured composition where low viscosities can provide plasticizing properties and high viscosities can provide thixotropic properties. The cured products can have improved reversion properties and the modulus can be controlled by using mixtures of polydiorganosiloxanes for (A).

The tetrafunctional ethoxy-ketoximo silane, (B), is a mixture of silane species of 6 to 27 weight percent tetraketoximosilane, 9 to 39 weight percent monoethoxytriketoximosilane, 38 to 60 weight percent diethoxydiketoximosilane, and 5.5 to 25 weight percent triethoxymonoketoximosilane. The ketoximo group has the formula $-O-N=CR'R'$ where each R' is methyl, ethyl, propyl, isopropyl, or butyl, and can be any of those ordinarily used in making ketoximosilanes, such as methylethylketoximo, dimethylketoximo, and diethylketoximo. The preferred ketoximo group is the methylethylketoximo group.

The tetrafunctional ethoxy-ketoximo silanes can be made by heating a mixture of ethylorthosilicate and ketoxime in an azeotroping solvent, such as toluene, to reflux which removes the ethanol as it is formed. This reflux is necessary because the reaction equilibrium lies far to the left of the reaction equation and the ethanol must be removed as it is formed to drive the reaction to the tetrafunctional ethoxyketoximo silanes used in this invention. The reflux temperature at the head is preferably held below 100° C. to prevent the product from decomposing. This reaction will usually provide the tetrafunctional ethoxy-ketoximo silanes used in the compositions of this invention in less than 12 hours. The reaction equation in a simple form is as follows:

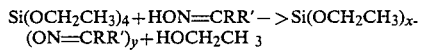

$$Si(OCH_2CH_3)_4 + HON=CRR' \rightarrow Si(OCH_2CH_3)_x(ON=CRR')_y + HOCH_2CH_3$$

The ketoxime is used in an excess amount to force the reaction to the right. The values of the subscripts x and y are such as to provide the mixtures as claimed herein, that is x can be 0, 1, 2, or 3 and y can be 1, 2, 3, or 4 in each molecule of the mixture.

The amount of crosslinker in the compositions of this invention is from 5.5 to 10 weight percent based on the total weight of the composition, ingredients (A)-(E). Preferably, the amount of crosslinker (B) is from 6 to 8 weight percent.

The compositions of this invention contain a tin catalyst (C). This tin catalyst is required with the crosslinkers described in (B) to provide the faster curing properties of these compositions which are characterized by a surface which becomes tack free in a short time (dry surface, not sticky), such as in less than 15 minutes after the composition is exposed to atmospheric moisture (about 50% relative humidity) at room temperature. These compositions cure fast to tack free surfaces, have resistance to reversion in confined areas especially under high temperature conditions, have improved heat stability, and develop sufficient strength and adhesion to be useful for adhering two substrates together in a short period of time so that they may be handled without separation before the composition is fully cured. The tin curing catalysts can include tin carboxylates, dibutyltindiacetate, dibutyltindilaurate, and stannous octoate, preferably the tin catalyst is dibutyltindilaurate.

The amount of tin catalyst in the compositions of this invention is from 0.1 to 0.25 weight percent based on the total weight of the composition, ingredients (A)-(E) preferably, the tin catalyst is present in an amount of from 0.15 to 0.2 weight percent. If the amount of the tin catalyst is less than 0.1 weight percent, the composition when exposure to atmospheric moisture does not cure completely through and the composition next to a substrate remains uncured and when elongated, cracks. If the amount of the tin catalyst is greater than 0.25 weight percent, the cured product may revert when confined, especially if the temperature increases much above room temperature.

Compositions which contain organotitanate catalyst, such as those described by Klosowski et al yellow upon storage and the rate of cure slows substantially at an organotitanate concentration of about 0.4 weight percent. A combination of both organotitanate catalyst and aminoalkyl functional silane causes substantial coloring of the composition upon storage, where the color changes from nearly white to yellow or orange. The use of the tin catalyst and the purified aminoalkyl functional silane has overcome this yellowing problem upon storage as well as improved the adhesion and the cure rate.

The compositions of the present invention also contain a reinforcing silica filler, (E). Examples of reinforcing silica fillers are fumed silica and precipitated silica. The reinforcing silicas can be treated to provide a hydrophobic filler surface. The amounts of the reinforcing silica filler can be from 5 to 20 weight percent based on the total weight of the composition, ingredients (A)-(E), preferably the reinforcing silica filler is present in an amount of from 9 to 14 weight percent. These reinforcing silica fillers provide a thixotropic characteristic to the uncured composition and provide increased tensile strengths to the cured products as compared to the compositions without the reinforcing silica filler.

The compositions of the present invention optionally contain an adhesion promoter (D) with reduced tendency to yellow upon storage. These adhesion promoters can include the aminoalkyl functional silanes in the purified form. These aminoalkyl functional silanes have the formula

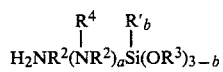

$$H_2NR^2(NR^2)_a \underset{\underset{R'_b}{|}}{\overset{\overset{R^4}{|}}{Si}}(OR^3)_{3-b}$$

in which $R^2$ is an alkylene radical, such as ethylene, propylene, isopropylene, butylene, and isobutylene; $R^3$ is an alkyl radical of from 1 to 5 carbon atoms per radical, such as methyl, ethyl, propyl, butyl, isopropyl, isobutyl, and amyl; $R^4$ is hydrogen atom or $R^3$ and R' is methyl, ethyl, propyl, or butyl; a is 0 or 1, and b is 0, 1 or 2. The aminoalkyl functional silanes can be purified by a number of different methods. It is believed that the presence of acid chlorides as impurities is a major cause of the yellowing occurring upon storage. Therefore, the use of purified aminoalkyl functional silanes reduces the tendency of the composition to yellow upon storage. One method of purification is to distill the aminoalkyl functional silane after it has been prepared or received from a supplier. Another method of purification is to wash the amino functional silane with a base to remove acidic impurities which may be present from the preparation. The base wash is useful with either the prepared aminoalkyl functional silane or the aminoalkyl functional silane received from a supplier. It may be possible to obtain a purified aminoalkyl functional silane from a supplier, but it should be tested to determine whether it will induce yellowing to the composition upon storage. The difference between a puriFied aminoalkyl functional silane and a non-purified aminoalkyl functional silane is remarkable. Compositions prepared using both the purified and the non-purified exhibited upon storage of six weeks at 50° C. and then cured gave colorimeter readings of 3 for the purified aminoalkyl functional silane and between 40 and 50 for the non-purified aminoalkyl functional silane. The preferred aminoalkyl functional silane is distilled N-(2-aminoethyl)-3-aminopropyl-triethoxysilane. The amount of adhesion promoter in the composition of this invention is from 0 to 3 weight percent based on the total weight of the composition, preferably from 1.5 to 3 weight percent. The compositions of the present invention preferably contain an adhesion promoter.

Other ingredients can also be used in the compositions of the present invention, such as heat stability additives, extending fillers, plasticizers, pigments and other colorants, other adhesion promoters, solvents, and flame retardant additives. These other ingredients should be thoroughly tested before a composition is put into commercial practice because they may have a detrimental effect on the curing properties, the storage stability, or the color formation on storage. Extending fillers can be calcium carbonate, diatomaceous earth, titanium dioxide, alumina, crushed quartz, and iron oxide. Another material which might be useful either as a filler or as a coloring agent is carbon black. The extending fillers may be used in larger quantities than the reinforcing fillers. The amounts of the fillers used will depend upon the particular properties wanted in the final cured product. Mixtures of filler can be used such as a mixture is reinforcing silica and calcium carbonate. These ingredients should not be used if they cause the uncured composition to cure in the package, not to cure when exposed to moisture, or to cure to a product which has inferior properties for the intended utility.

The compositions of this invention are made by mixing ingredients (A) through (E) in amounts as specified, to provide a one package composition which is stable in the absence of moisture and which cures to an elastomeric material when exposed to moisture. For purposes of this application, ingredients (A)-(E) should add up to 100 weight percent. The compositions of the present invention are preferably prepared by mixing (A)-(E) under anhydrous conditions, i.e., the ingredients used should not contain amounts of moisture or water which will cause the composition to cure in the storage package. The compositions should also be mixed under conditions which does not allow the entrance of moisture into the system in an amount sufficient to cause the mixture to have deleterious storage properties, curing properties, or cured properties. After the compositions are made, they are stored in packages which keep moisture out. The longest storage stability times can be obtained by making and storing the compositions under conditions which are free from moisture and water. The better the composition is maintained under anhydrous conditions, the longer the time the composition will remain uncured in the storage package. The compositions can also be protected from moisture entering the composition incidentally and accidentally by using an excess of ingredient (B). The compositions of this invention should have at least one mole of tetrafunctional ethoxy-ketoximo silane are present per mole of hydroxyl group in (A). Because small amounts of water entering the composition either during preparation or during storage can result in a cured product, it is advisable to use a mole ratio of silane (B) to hydroxyl group of (A) of greater than one to one. However, if careful attention is given to the preparation and the storage package, compositions can be made with a ratio of about one mole of silane (B) per mole of hydroxyl group of (A). Because the molecular weight of the polydiorganosiloxane can vary, the higher the molecular weight used in preparing a composition, the lower the hydroxyl group content of a given weight of polydiorganosiloxane will be. Therefore, it is recommended that in the preparation of the compositions, the ratio of the moles of silane in (B) to the moles of hydroxyl group in (A) be observed and controlled to provide a stable product. Preferably, the compositions of this invention are those which contain from 4 to 7 moles of silane (B) per mole of hydroxyl group of (A). Compositions which have these higher mole ratios of silane (B) to hydroxyl group of (A) are not as sensitive to the entrance of moisture as compositions having smaller amounts of silane (B) per hydroxy group of (A). The compositions of this invention cure to elastomeric material, such as rubbery sealants, caulking materials, adhesives, coatings, and encapsulating materials. An advantage of the compositions of this invention is that they cure rapidly, developing enough adhesive strength when used between two substrates to allow the bonded assembly to be handled within one or two hours compared to several hours or days. The compositions of the present invention are useful in the construction industry for adhering substrates such as polyvinyl chloride, wood, metals such as aluminum or steel, and glass. The compositions of the present invention do not bubble when cured under hot conditions as do the methoxy-ketoximo silanes do, where the hot conditions are temperatures such as above 100° C. The compositions of the present invention can have a modulus determined by selecting the kind of polydiorganosiloxane (A) and the amount of crosslinker (B). The cured products of the compositions of this invention also exhibit resistance to oils and other solvents such as glycol and water mixtures, such properties would make the compositions of this invention useful as formed-in-place-gaskets for use in automobiles and other machinery which needs gaskets with solvent and oil resistance.

The following examples are present for illustrative purposes and should not be construed as limiting the present invention Which is properly delineated in the claims. In the examples, "parts" refers to parts by weight and the viscosities are measured at 25° C.

EXAMPLE 1

Compositions were prepared by adding 100 parts of polydimethylsiloxane having 85 percent of the end groups as hydroxyl and 15 percent of the end groups as trimethylsiloxy and having a viscosity of 12.5 Pa.s was mixed in the Ross mixer with 7.4 parts of a tetrafunctional ethoxy-ketoximo silane mixture as the crosslinker, 0.19 part of dibutyltindilaurate, and 1.9 parts of distilled N-(2-aminoethyl)-3-aminopropyltri-ethoxysilane. To this mixture, 14 parts of reinforcing silica filler having a surface area of 150 square meters per gram was added and mixed until the filler was wet out. The composition was de-aired and then put into a container which protected it from the entrance of moisture. The tetrafunctional ethoxy-ketoximo silane mixture contained tetra(methylethylketoximo)-silane, monoethoxytri(methylethylketoximo)silane, and diethoxydi(methylethylketoximo)silane as described in Table I.

The silane mixture was prepared by mixing 19 parts of tetraethoxysilane, 36.4 parts of tetra(methylethylketoximo)silane, and 44.6 parts of toluene which had been dried. This mixture was then placed in a reflux pot with a distillation column, heated, and distilled until the desired mixture of silanes were obtained. The toluene was then distilled to obtain the final ethoxy-ketoximo tetrafunctional silane. The mixture was identified by gas liquid chromatography. The various silane mixtures were prepared by this same method and the mixtures were as described in Table I.

The modulus was determined at 100% elongation according to ASTM Standard D-412. The results for each composition were as shown in Table II.

TABLE II

| PROPERTY | COMPOSITION BASED ON SILANE MIXTURE | | | | | | | |
|---|---|---|---|---|---|---|---|---|
| | A | B | C | D | E | F | G | H |
| Skin-over-time, min. | 2.75 | Gelled*** | 1.75 | 1.5 | 1.5 | 2.0 | 1.75 | 2.0 |
| Tack-free-time, min. | 3.25 | — | 2.0 | 3.5 | 2.75 | 2.5 | 2.0 | 2.0 |
| Durometer, Shore A | 36 | — | 39 | 33 | 35 | 37 | 38 | 40 |
| Tensile Strength at break, MPa | 1.91 | — | 1.69 | 2.23 | 2.01 | 1.90 | 1.83 | 1.94 |
| Elongation at break, % | 375 | — | 292 | 351 | 312 | 344 | 313 | 323 |
| Modulus at 100% elongation, MPa | 0.66 | — | 0.72 | 0.79 | 0.81 | 0.68 | 0.72 | 0.76 |

***Composition gelled before test specimens could be prepared and properties were not obtained.

EXAMPLE 2

A composition was prepared as described in Example 1 in which 8.64 parts of a tetrafunctional ethoxy-ketoximo silane mixture, 1.85 parts of distilled N-(2-aminoethyl)-3-aminopropyltriethoxysilane, 0.25 parts of dibutyltin dilaurate, and 12.35 parts of reinforcing silica were used per 100 parts of the polydimethylsiloxane. The properties were obtained as described in Example 1 and the results were:

Cured 14 days at room temperature and humidity:
Durometer, Shore A scale = 37
Tensile strength at break, MPa = 1.83

TABLE I

| SILANE MIXTURE* | WEIGHT PERCENT | | | | | | | |
|---|---|---|---|---|---|---|---|---|
| | A | B** | C | D | E | F | G | H |
| Tetra(methylethylketoximo)silane | 12.9 | 31.7 | 9.4 | 7.6 | 6.3 | 17.5 | 22.2 | 26.9 |
| Tri(methylethylketoximo)monoethoxysilane | 31.1 | 28.6 | 16.0 | 38.3 | 9.2 | 30.5 | 29.8 | 29.2 |
| Di(methylethylketoximo)diethoxysilane | 48.2 | 34.7 | 56.4 | 45.1 | 59.6 | 44.9 | 41.5 | 38.1 |
| Mono(methylethylketoximo)triethoxysilane | 7.7 | 5.1 | 18.2 | 9.0 | 24.9 | 7.1 | 6.4 | 5.8 |

*The weight percentages are based on the total of the four silanes as equal to 100 weight percent. The mixtures contain other ingredients such as ethylorthosilicate, ethanol, methylethylketoxime, high boilers, and unknown material. The total amounts of such ingredients range from about 10 to about 20 weight percent and were A = 21.2 wt %, B = 23.3 wt %, C = 15.2 wt %, D = 11.3 wt %, E = 11.7 wt %, F = 21.7 wt %, G = 22.2 wt %, H = 22.8 wt %.
**Comparative example.

Specimens of the compositions were prepared by making slabs by the draw-down method using a chase having a 1/16 inch depth which specimens were exposed to moisture and the following properties were measured. The skin over time (SOT) was measured by observing the time from exposure of the composition to moisture until a finger lightly touched to the surface of the curing composition was withdrawn without transfer of composition to the finger. The tack free time (TFT) was the time measured from the exposure of the composition until a dry surface, free from tack was obtained. The curing composition was observed to see if any cracking occurred during the curing process.

Other specimens were obtained as described above and were allowed to cure at 77° C. and 50% relative humidity for 7 days and then the following properties were measured. The durometer on the Shore A scale was determined according to ASTM Standard D-2240, the tensile strength at break and the elongation at break were determined according to ASTM Standard D-412.

Elongation at break, % = 313
Modulus, 100% elongation, MPa = 0.74

After room temperature cure, 14 days exposure to 50° C.:
Durometer, Shore A scale = 39
Tensile strength at break, MPa = 1.59
Elongation at break, % = 270
Modulus, 100% elongation, MPa = 0.77

After room temperature cure, 14 days exposure to 70° C.:
Durometer, Shore A scale = 37
Tensile strength at break, MPa = 1.82
Elongation at break, % = 319
Modulus, 100% elongation, MPa = 0.72

After room temperature cure, 14 days immersion in water at room temperature:
Durometer, Shore A scale = 35
Tensile strength at break, MPa = 1.52
Elongation at break, % = 270
Modulus, 100% elongation, MPa = 0.70

From the above results, the compositions of the present invention do not revert under heat conditions or when exposed to water at room temperature.

The silane mixture contained the following tetrafunctional ethoxy-ketoximo silanes: 11.7 weight percent monoethoxytri(methylethylketoximo)silane, 46.7weight percent diethoxydi(methylethylketoximo)silane, and 35.0 weight percent triethoxymono(methylethylketoximo)silane. The tetrafunctional ethoxy-detoximo silane mixture was prepared as described in Example 1.

EXAMPLE 3

A composition was prepared as described in Example 1 using the tetrafunctional ethoxy-ketoximo silane mixture A, except that a hydroxyl endblocked polydimethylsiloxane having a viscosity of about 12.5 Pa.s was used in place of the polydimethylsiloxane having 85 percent of the end groups as hydroxyl and 15 percent of the end groups as trimethylsiloxy groups.

The composition was cured and tested as described in Example 1. The composition had a skin-over-time of 3.25 seconds and a tack-free-time of 3.25 seconds. After curing at room temperature for 7 days, the durometer on the Shore A scale was 46, the tensile strength at break was 2.52 MPa, the elongation at break was 278%, and the 100% modulus was 1.03 MPa. This example shows that similar results were obtained from compositions made with hydroxyl endblocked polydimethylsiloxane and from compositions made with polydimethylsiloxane which was partially endblocked with trimethylsiloxy groups except that the partially endblocked polydimethylsiloxane had lower modulus.

EXAMPLE 4

Compositions were prepared as described in Example 1 using Silane mixture A but varying the amounts of the silane mixture, the reinforcing silica, dibutyltindiacetate, and using 1.6 parts of distilled N-(Z-aminoethyl)-3-aminopropyltriethoxysilane instead of the 1.9 parts as used in Example 1. The amounts which were varied were as shown in Table III.

TABLE III

| RUN NO. | POLYDIMETHYLSILOXANE | PARTS SILANE MIXTURE | SILICA | DIBUTYLTINDIACETATE |
|---|---|---|---|---|
| 1 | 80.45 | 6.0 | 11.8 | 0.15 |
| 2 | 80.45 | 6.0 | 11.8 | 0.15 |
| 3 | 80.45 | 6.0 | 11.8 | 0.15 |
| 4**** | 81.6 | 6.0 | 10.5 | 0.3 |
| 5 | 79.75 | 8.0 | 10.5 | 0.15 |
| 6**** | 78.3 | 8.0 | 11.8 | 0.3 |
| 7 | 77.25 | 8.0 | 13.0 | 0.15 |
| 8**** | 81.25 | 4.0 | 13.0 | 0.15 |
| 9**** | 82.3 | 4.0 | 11.8 | 0.3 |
| 10**** | 83.75 | 4.0 | 10.5 | 0.15 |

****Comparative Examples

The compositions were cured by exposure to the atmosphere at room temperature. Properties were performed on each composition initially after preparation and then curing the composition by exposing it to atmospheric moisture for 7 days, after storing the composition in a sealed container for four weeks at 50° C. and then the properties were measured after curing the composition by exposing it to atmospheric moisture for 7 days, and after storing the composition in a sealed container for four weeks at 70° C. and then the properties were measured after curing the composition by exposing it to atmospheric moisture for 7 days. The properties were as shown in Table IV and were determined as described in Example 1. The rate of cure and extrusion rate were observed and are reported in Table IV.

TABLE IV

| PROPERTY | 1 | 2 | 3 | 4 | 5 | 6 | 7 | 8 | 9 | 10 |
|---|---|---|---|---|---|---|---|---|---|---|
| INITIAL PROPERTIES | | | | | | | | | | |
| RATE OF CURE, mm/day | 2.0 | 2.0 | 2.0 | 2.0 | 1.7 | 1.7 | 1.9 | 3.0 | 3.0 | 3.0 |
| EXTRUSION RATE, g/min | 220 | 188 | 204 | 266 | 298 | 196 | 144 | 148 | 136 | 201 |
| SKIN-OVER-TIME, minutes | 1.5 | 1.5 | 1.5 | 1.5 | 1.5 | 1.0 | 1.0 | 4.5 | 1.0 | 2.5 |
| TACK-FREE-TIME, minutes | 4.0 | 2.75 | 3.0 | 2.5 | 4.5 | 2.0 | 2.5 | 12.5 | 1.0 | 3.5 |
| DUROMETER, Shore A | 35 | 36 | 35 | 30 | 35 | 38 | 43 | 27 | 20 | 22 |
| TENSILE STRENGTH, at break, MPa | 1.77 | 1.64 | 1.69 | 1.37 | 1.37 | 1.58 | 1.83 | 1.70 | 0.99 | 1.24 |
| ELONGATION at break, % | 293 | 252 | 262 | 186 | 200 | 207 | 414 | 211 | 302 | |
| MODULUS, 50% MPa | 0.59 | 0.63 | 0.63 | 0.52 | 0.63 | 0.70 | 0.85 | 0.47 | 0.44 | 0.41 |
| MODULUS, 100% MPa | 0.76 | 0.84 | 0.82 | 0.68 | 0.85 | 0.94 | 1.11 | 0.59 | 0.58 | 0.53 |
| MODULUS, 150%, MPa | 0.96 | 1.05 | 1.03 | 0.89 | 1.12 | 1.24 | 1.43 | 0.72 | 0.76 | 0.68 |
| AFTER 4 WEEK STORAGE AT 50° C. | | | | | | | | | | |
| EXTRUSION RATE, g/min | 251 | 211 | 232 | 332 | 350 | 240 | 154 | 133 | 34 | 10 |
| SKIN-OVER-TIME, | 3 | 3 | 4 | 18 | 2 | 5 | 4 | 5 | >3 HR | >3 HR |

TABLE IV-continued

| PROPERTY | 1 | 2 | 3 | 4 | 5 | 6 | 7 | 8 | 9 | 10 |
|---|---|---|---|---|---|---|---|---|---|---|
| minutes | | | | | | | | | | |
| TACK-FREE-TIME, minutes | 6 | 5 | 6 | 78 | 5 | 8 | 6 | 17 | >3 HR | >3 HR |
| DUROMETER, Shore A | 37 | 38 | 37 | 33 | 35 | 42 | 44 | 23 | 6 | 9 |
| TENSILE STRENGTH, at break, MPa | 1.89 | 2.05 | 1.87 | 1.84 | 1.70 | 2.08 | 2.07 | 1.24 | 0.18 | 0.49 |
| ELONGATION at break, % | 365 | 372 | 343 | 324 | 294 | 297 | 309 | 624 | 28 | 203 |
| MODULUS, 50% MPa | 0.54 | 0.59 | 0.56 | 0.53 | 0.54 | 0.68 | 0.73 | 0.34 | — | 0.20 |
| MODULUS, 100%, MPa | 0.69 | 0.75 | 0.72 | 0.70 | 0.72 | 0.89 | 0.92 | 0.39 | — | 0.30 |
| MODULUS, 150%, MPa | 0.87 | 0.93 | 0.92 | 0.90 | 0.92 | 1.13 | 1.14 | 0.45 | — | 0.39 |
| AFTER 4 WEEKS AT 70° C. STORAGE | | | | | | | | | | |
| EXTRUSION RATE, g/min | 300 | 209 | 208 | 286 | 491 | 76 | 220 | 93 | 409 | 70 |
| SKIN-OVER-TIME, minutes | 6 | 6 | 6 | DNC | 2 | 6 HR | 1 | 6 | DNC | DNC |
| TACK-FREE-TIME, minutes | 14 | 16 | 26 | DNC | 8 | 9 HR | 3 | 45 | DNC | DNC |
| DUROMETER, Shore A | 33 | 31 | 33 | DNC | 33 | 24 | 43 | 15 | DNC | DNC |
| TENSILE STRENGTH, at break, MPa | 1.67 | 1.59 | 1.66 | DNC | 1.41 | 0.63 | 1.76 | 0.50 | DNC | DNC |
| ELONGATION at break, % | 350 | 326 | 323 | DNC | 284 | 131 | 302 | 547 | DNC | DNC |
| MODULUS, 50%, MPa | 0.48 | 0.47 | 0.50 | DNC | 0.48 | 0.43 | 0.68 | 0.25 | DNC | DNC |
| MODULUS, 100%, MPa | 0.63 | 0.64 | 0.67 | DNC | 0.63 | 0.55 | 0.83 | 0.27 | DNC | DNC |
| MODULUS, 150%, MPa | 0.79 | 0.81 | 0.84 | DNC | 0.79 | — | 1.03 | 0.29 | DNC | DNC |

DNC = did not cure

The above results showed that the compositions outside the limits do not provide satisfactory properties. Runs 4 and 6 exceed the limit of dibutyltindilaurate, Runs 8 and 10 have insufficient silane mixture, and Run 9 exceeds the limit of dibutyltindilaurate and has insufficient silane mixture.

EXAMPLE 5

A composition was prepared as described in Example 1 using the ingredients described in Example 1 in the amounts of 79.74 parts of the polydimethylsiloxane, 6.5 parts of silane mixture A, 12 parts of reinforcing silica, 1.6 parts of distilled N-(2-aminoethyl)-3-aminopropyltriethoxysilane, and 0.16 part of dibutyltindilaurate. This composition is designated Composition A.

A similar composition was prepared as described above using the same ingredients but instead of using silane mixture A, a silane mixture of methyltri(methylethylketoximo)silane, methyldi(methylethylketoximo)methoxysilane, and methyl(methylethylketoximo)dimethoxysilane was used. This composition is designated Composition B and is presented as a comparative example.

Each of the above compositions were used to determine the degree of the development of adhesive strength when used between two substrates. Each composition was deposited between a glass substrate and a polyvinyl chloride substrate and also between a glass substrate and a wood substrate. The adhesive strength was determined one hour after deposition and two hours after deposition. The results obtained were as shown in Table V.

TABLE V

| | ADHESIVE STRENGTH, in newtons | | | |
|---|---|---|---|---|
| COMP- | GLASS-POLYVINYL CHLORIDE | | GLASS-WOOD | |
| OSITION | 1 HOUR | 2 HOURS | 1 HOUR | 2 HOURS |
| A | 200.2 | 280.2 | 120.1 | 186.8 |
| B | 13.3 | 26.7 | 8.9 | 17.8 |

The peel strength of Composition A was determined on the substrates shown in Table VI after curing for seven days at room temperature. The results are shown in newtons per meter.

TABLE VI

| SUBSTRATE | PEEL ADHESION, N/m |
|---|---|
| Anodized Aluminum | 3327 |
| Clear Glass | 3152 |
| Polyvinyl chloride | 2977 |

That which is claimed is:

1. A composition consisting essentially of a product which is storage stable in a package when protected from moisture but cures when removed from the package and exposed to moisture and which is obtained by mixing the following ingredients,
(A) from 66.75 to 89.4 weight percent of a hydroxyl endblocked polydiorganosiloxane having an average viscosity at 25° C. of from 0.5 to 100 Pa.s and the organic radicals bonded to the silicon atom are selected from the group consisting of monovalent hydrocarbon radicals and monovalent halogenated hydrocarbon radicals, (B) from 5.5 to 10 weight percent of a tetrafunctional ethoxy-ketoximo silane mixture of 6 to 27 weight percent of tetraketoximosilane, 9 to 39 weight percent of monoethoxytriketoximosilane, 38 to 60 weight percent of diethoxydiketoximosilane, and 5.5 to 25 weight percent triethoxymonoketoximosilane in which the ketoximo groups have a formula —O—N=CR'R' in which each R' is an alkyl radical having from 1 to 4 carbon atoms, (C) from 0.1 to 0.25 weight percent of a tin catalyst, (D) from 0 to 3 weight percent of an adhesion promoter which does not impart color to the composition, and (E) from 5 to 20 weight percent of reinforcing silica.

2. The composition according to claim 1 in which the hydroxyl endblocked polydiorganosiloxane of (A) is partially endblocked with triorganosiloxy groups.

3. The composition according to claim 1 in which the tetrafunctional ethoxy-ketoximo silane is present in an amount of from 6 to 8 weight percent.

4. The composition according to claim 2 in which the tetrafunctional ethoxy-ketoximo silane is present in an amount of from 6 to 8 weight percent.

5. The composition according to claim 1 in which the tin catalyst is a diorganotin dicarboxylate 6. The composition according to claim 2 in which the tin catalyst is a diorganotin dicarboxylate.

7. The composition according to claim 4 in which the tin catalyst is a diorganotin dicarboxylate.

8. The composition according to claim 7 in which the diorganotin dicarboxylate is dibutyltin dilaurate.

9. The composition according to claim 8 in which the dibutyltin dicarboxylate is present in an amount of from 0.15 to 0.2 weight percent.

10. The composition according to claim 1 in which the adhesion promoter is present and is an aminoalkyl functional silane.

11. The composition according to claim 2 in which the adhesion promoter is present and is an aminoalkyl functional silane.

12. The composition according to claim 4 in which the adhesion promoter is present and is an aminoalkyl functional silane.

13. The composition according to claim 7 in which the adhesion promoter is present and is an aminoalkyl functional silane.

14. The composition according to claim 9 in which the adhesion promoter is present and is an aminoalkyl functional silane.

15. The composition according to claim 10 in which the aminoalkyl functional silane has the general formula $$H_2NR^2(NR^2)_a Si(OR^3)_{3-b}\overset{R^4}{\underset{|}{}}\overset{R'_b}{\underset{|}{}}$$

in which $R^2$ is an alkylene radical, $R^3$ is an alkyl radical of from 1 to 5 carbon atoms per radical, $R^4$ is hydrogen atom or $R^3$ and R' is selected from the group consisting of methyl, ethyl, propyl, and butyl; a is 0 or 1, and b is 0, 1 or 2.

16. The composition according to claim 12 in which the aminoalkyl functional silane has the general formula $$H_2NR^2(NR^2)_a Si(OR^3)_{3-b}\overset{R^4}{\underset{|}{}}\overset{R'_b}{\underset{|}{}}$$

in which $R^2$ is an alkylene radical, $R^3$ is an alkyl radical of from 1 to 5 carbon atoms per radical, $R^4$ is hydrogen atom or $R^3$ *and R' is selected from the group consisting of methyl, ethyl, propyl, and butyl; a is 0 or 1, and b is 0, 1 or 2.*

17. The composition according to claim 14 in which the aminoalkyl functional silane has the general formula $$H_2NR^2(NR^2)_a Si(OR^3)_{3-b}\overset{R^4}{\underset{|}{}}\overset{R'_b}{\underset{|}{}}$$

in which $R^2$ is an alkylene radical, $R^3$ is an alkyl radical of from 1 to 5 carbon atoms per radical, $R^4$ is hydrogen atom or $R^3$ and R' is selected from the group consisting of methyl, ethyl, propyl, and butyl; a is 0 or 1, and b is 0, 1 or 2.

18. The composition according to claim 15 in which the aminoalkyl functional silane is distilled N-(2-aminoethyl)-3-aminopropyltriethoxysilane in an amount of from 1.5 to 3 weight percent.

19. The composition according to claim 17 in which the aminoalkyl functional silane is distilled N-(2-aminoethyl)-3-aminopropyltriethoxysilane in an amount of from 1.5 to 3 weight percent.

20. The composition according to claim 1 in which the reinforcing silica of (E) is present in an amount of from 9 to 14 weight percent.

21. The composition according to claim 2 in which the reinforcing silica of (E) is present in an amount of from 9 to 14 weight percent.

22. The composition according to claim 19 in which the reinforcing silica of (E) is present in an amount of from 9 to 14 weight percent.

* * * * *